United States Patent [19]

Prassas et al.

[11] Patent Number: 5,445,775
[45] Date of Patent: Aug. 29, 1995

[54] METHOD OF FORMING U.V. STABILIZED POROUS PIPE

[75] Inventors: Thomas N. Prassas, Glendale; Shannon Bard, Scottsdale, both of Ariz.

[73] Assignee: Aquapore Moisture Systems, Inc., Phoenix, Ariz.

[21] Appl. No.: 144,316

[22] Filed: Nov. 1, 1993

Related U.S. Application Data

[62] Division of Ser. No. 930,345, Aug. 14, 1992, Pat. No. 5,299,885.

[51] Int. Cl.[6] ............................................ B29C 47/88
[52] U.S. Cl. ................................. 264/41; 264/45.9; 264/178 R; 264/209.7; 425/380
[58] Field of Search ............... 264/209.1, 209.6, 209.7, 264/41, 45.9, 178 R; 425/380; 405/45

[56] References Cited

U.S. PATENT DOCUMENTS

| | | | |
|---|---|---|---|
| 2,807,505 | 9/1957 | Weitzel | 264/209.1 |
| 4,110,420 | 8/1978 | Turner | 264/41 |
| 4,182,582 | 1/1980 | Youval et al. | 405/45 |
| 4,517,316 | 5/1985 | Mason | 264/41 |
| 4,577,998 | 3/1986 | Dorrn | 405/45 |
| 4,615,642 | 10/1986 | Mason | 264/41 |
| 4,616,055 | 10/1986 | Mason | 264/41 |
| 4,931,236 | 6/1990 | Hettinga | 264/41 |
| 4,958,770 | 9/1990 | Mitchell | 264/209.7 |
| 5,152,634 | 10/1992 | Maso | 405/45 |

Primary Examiner—Jeffery R. Thurlow
Attorney, Agent, or Firm—Marvin E. Jacobs

[57] ABSTRACT

Porous pipe formed of particles of vulcanized rubber dispersed in a binder resin such as polyethylene are stabilized to reduce degradation by ultraviolet light by dispersing in the binder resin an effective amount of an ultraviolet stabilizer such as 0.1 to 10% by weight of carbon black.

13 Claims, 1 Drawing Sheet

METHOD OF FORMING U.V. STABILIZED POROUS PIPE

This is a Division of application Ser. No. 07/930,345, filed Aug. 14, 1992 now U.S. Pat. No. 5,299,885, Apr. 5, 1994.

TECHNICAL FIELD

The present invention relates to porous irrigation hose and, more particularly, this invention relates to porous irrigation hose having stability to ultraviolet radiation.

BACKGROUND OF THE INVENTION

Porous pipe has been developed that weeps or drips water along its length. The hose wall is a composite formed of a dispersion of a major portion of prevulcanized elastomer particles dispersed in a continuous binder phase, usually a thermoplastic resin such as polyethylene. Channels or crevices are formed in the wall due to the lack of excess binder and the incompatibility between the binder and the dispersed particles. When the pipe is placed under pressure, the wall expands slightly and water traverses the wall and forms beads or drops on the outside surface which drip to form a continuous line source of water. Porous hose can also be used underground as a line source of irrigation at the root level or around foundations to remove excessive moisture from the soil. Representative patents describing the manufacture of porous pipe are U.S. Pat. Nos. 4,517,316, 4,616,055 and 4,615,642.

Porous pipe is finding increasing use as soaker hose manufactured with or without hose fittings for use in retail do-it-yourself (DIY), lawn and garden and professional landscape and agricultural applications. Porous hose used in outdoor applications is found to weather and become brittle and crack after extended exposure to the outdoor ambient environment. It was believed that the aging was due to ozone in the air and was not caused by incident radiation. It is known that hydrocarbon resins such as polyethylene are degraded by ultraviolet radiation. The radiation can create free radicals resulting in chain scission or the creation of peroxy or other radicals that can degrade the polymer chains. However, it is also known that adding 3 to 5% by weight of carbon black pigment to transparent resins such as polyethylene stabilizes them from attack by ultraviolet radiation. Porous pipe is a composite containing at least 60% by weight of reclaimed rubber particles which themselves contain about 30% carbon black. Therefore, the composite hose already contains about 20% carbon black. The product is opaque. It was believed that this opacity and the high content of carbon black would provide all the ultraviolet absorption that the hose required.

STATEMENT OF THE INVENTION

It has now been discovered that the addition of ultraviolet absorbers or stabilizers to the continuous binder phase results in substantial reduction in degradation of the physical properties of the wall of porous hose due to ultraviolet radiation. It was discovered on microscopic examination of the product that the binder resin formed a thin transparent film encapsulating the rubber particles. The prevulcanized particles firmly bind the carbon black and do not contribute any substantial carbon black to the binder phase. The carbon black is not available for absorption of ultraviolet light. The incident ultraviolet light apparently enters and degrades the transparent binder film leading to stress cracking and failure. The stress cracking is throughout the wall of the pipe. The ultraviolet light must flow through the binder film by light pipe principles and generate radicals that degrade the polyethylene or other binder polymer. The thinness of the film of transparent binder resin may act to concentrate or attenuate the effects of the incident ultraviolet radiation and accelerate the ageing-stress cracking process.

The addition of a small amount of an absorber or stabilizer is found to significantly increase the environmental stress crack resistance of the porous pipe. After accelerated exposure for an extended period, porous pipe formulated without a U.V. absorber cracked on bending. Porous pipe formulated to contain a U.V. absorber according to the invention could be bent without cracking. Samples of regular and U.V. stabilized porous pipe were tested for 6 months exposure to incident Arizona sunlight. The regular pipe was brittle and cracked. The U.V. stabilized pipe was still flexible and uncracked after six months exposure.

The U.V. stabilized pipe of the invention will substantially extend the service life of porous pipe exposed to ultraviolet light, especially in the southern and western United States which have many more days of clear skies and direct sunlight exposure at ground level. The U.V. stabilized pipe of the invention will also be able to be deployed in curved or bent configurations since the stress-crack resistance is substantially improved.

These and other features and many attendant advantages of the invention will become apparent as the invention becomes better understood by reference to the following detailed description when considered in conjunction with the accompanying drawings.

DETAILED DESCRIPTION OF THE INVENTION

Figure 1:
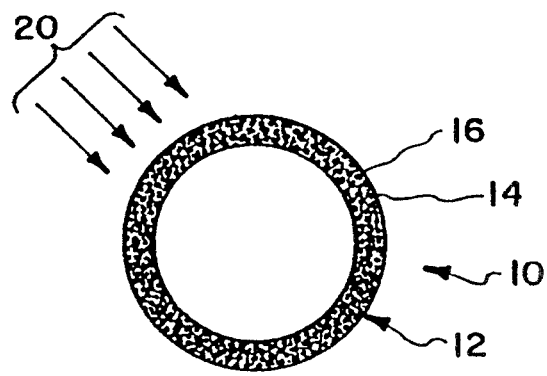
FIG. 1 is an end view of a porous pipe produced in accordance with the prior art.
Figure 2:
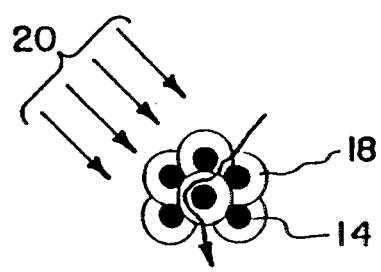
FIG. 2 is an enlarged partial view of the wall of FIG. 1 showing the film of binder resin on the rubber particles.

Referring now to FIGS. 1 and 2, porous pipe 10 has a wall 12 formed of a dispersion of discrete elastomer particles 14 dispersed in a binder resin 16. The binder resin coats the particles 14 with a thin transparent film 18. The binder films 18 are connected to form a continuous matrix which holds the product together. In the prior art product, the binder film 18 was unpigmented and allowed incident radiation 20 to enter and degrade the film 18. Ultraviolet radiation can create free radicals causing chain scission of the hydrocarbon chains of the binder resin. Ultraviolet radiation can in the presence of oxygen from the air result in the formation of radicals that can form carbonyl groups or cause embrittlement by cross-linking or scission of the backbone chains of the binder resin.

Figure 3:
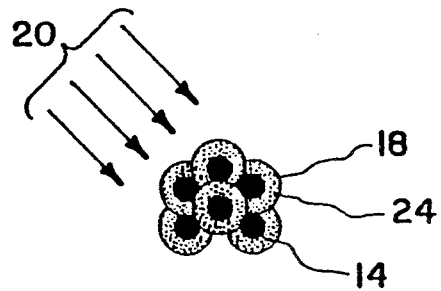
FIG. 3 is an enlarged view of the wall of a product produced in accordance with the invention showing the stabilized binder film.

As shown in FIG. 3, when the binder resin contains an ultraviolet radiation stabilizer such as carbon black particles 24, the ultraviolet radiation 20 is absorbed or its reaction products are passivated such that the chemical and physical properties of the binder resin are not degraded.

The ultraviolet stabilizer is a material that can be dissolved or dispersed in the binder resin and is not degraded at the temperature experienced during extrusion, typically from 250° F. to 450° F. The stabilizer is generally present in a minor amount from 0.1 to 10% by weight of the binder resin, generally from 0.1 to 3% by weight.

The ultraviolet absorber can be a dispersion of carbon black. The use of carbon black as an ultraviolet absorber for polyethylene and vinyl resins is well known. Carbon black is known to exist in polycyclic form and to contain hydroxyl and oxygen substitution. Carbon black may in fact function as a polyhydric phenol providing both ultraviolet and thermal stabilization.

Other recommended ultraviolet radiation stabilizers are benzophenones and amines such as benzotriazoles. Representative are 2-hydroxy-benzonphenones selected from compounds of the formula:

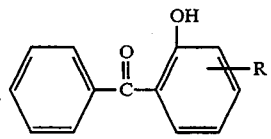

Where R may be selected from H, lower alkyl of 1 to 12 carbon atoms or lower alkoxy of 1-12 carbon atoms, preferably in the 4-position. 2-hydroxyl-4-n-octoxybenzophenone is a nonmigratory additive that preferentially absorbs ultraviolet radiation and dissipates it as non-destructive energy. It effectively inhibits photoinitiated physical failure of polyethylene films. Its solubility in solvents and plasticizers permits it to be incorporated in vinyl films or foamed products. This absorber is generally utilized in amounts from 0.1 to 1% by weight, preferably from 0.3 to 0.5% by weight. Development of 0.1% carbonyl content in polyethylene films or molded products coincides with noticeable degradation in physical appearance and properties. Polyethylene rubber composite hose will have less than 0.1% carbonyl in the polyethylene binder film after 12 months exposure to Arizona sunlight.

Another type of recommended U.V. absorber for polyethylene or vinyl resins are 2-Hydroxy-benzotriazoles of the formula:

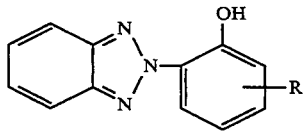

in which $R^1$ is selected from hydrogen, lower alkyl of 1-12 carbon atoms or lower alkoxy of 1-12 carbon atoms, preferably in the 5-position. 2-(2-Hydroxy 5-t-octylphenyl)-benzotriazole is an effective ultraviolet light stabilizer for polyvinyl chloride resins at the 0.1 to 0.5% by weight.

Oligomeric ultraviolet stabilizers of the hindered amine class can provide both excellent stabilization at low concentration to ultraviolet light and thermal and ultraviolet protection to polyolefin polymer systems under outdoor exposure conditions.

The composition for extruding porous pipe essentially contain from about 30% to about 40% by weight of thermoplastic binder resin, about 60–70% by weight, preferably 63–67% by weight of discrete elastomer particles and an ultraviolet stabilizer uniformly dissolved or dispersed in the binder resin in an amount effective to stabilize the resin from the degradation effects of ultraviolet light for at least 6 months. The carbonyl content of the binder resin is preferably below 0.1% by weight for at least 6 months. The composition may contain optional ingredients such as small amounts of lubricants or slip agents to aid in mixing and extruding the pipe.

As disclosed in U.S. Pat. Nos. 4,517,316 and 4,616,055, the moisture content of the rubber particles is maintained below 1.0% by weight, usually below 0.5% by weight and preferably as low as possible, such as no more than 0.1% by weight. Moisture can be removed from the rubber particles by passing them through a drier before feeding to the extruder or drying them under ambient conditions such as in a hot, dry ambient as experienced in the Southwestern United States.

The thermoplastic binder resin has a melting temperature suitable for extrusion of the porous pipe, generally from 250° F. to 450° F., usually from 275° F. to 350° F. The resins can be polyolefins or polyvinyl resins. Polyethylene resins are preferred due to their flexibility, inertness and extrudability. The polyethylene can be of the high density or low density types. Low density resins having a density below 0.95 usually 0.92 to 0.94, provide products with better flexibility and elongation, especially linear low density (LLD) polyethylenes which have less chain branching and a narrower molecular weight distribution.

Polyethylene is less hygroscopic then the rubber particles and is present in one-half of the amount of the rubber. Unless the surface of polyethylene particles contains excessive moisture exceeding 0.5% by weight, it may not be necessary to predry the polyethylene before extrusion. The polyethylene is usually provided as short rods or pellets having a particle size of about 30–50 mesh.

The elastomer particles are prevulcanized. They remain discrete and do not dissolve in the binder resin. The particles are preferably reclaimed rubber recycled from the tread portion of used tires or other sources. They also can be virgin rubber such as flashings from tire manufacture. The rubber is ground to a particle size excluding large particles above about 40 mesh. Excessive fines should be avoided. A preferred product is a 30 mesh granular reclaimed rubber having a moisture content as delivered of no more than 0.5% by weight.

The mixture of binder resin and rubber particles is formed into porous pipe by continuous extrusion. Venting is not necessary to produce high quality porous hose. The extruder barrel is heated to a temperature above the melting point of the binder resin. In the case of low density polyethylene the extruder barrel is heated to a temperature from 250° F. to 450° F. The die is generally separately heated to a temperature from 300° F. to 400° F. The extruder may contain compression and mixing sections or can contain a single screw with continuous spiral thread.

As the hot, compressed extruded product leaves the die, the rubber particles expand to their normal volume. The porous hose passes through a long cooling trough containing cooling water generally at or near room temperature, usually from 50° F. to 80° F.

The resin and rubber particles can be premixed in a mixer such as a ribbon blender. The soluble stabilizers can be added at the mixing stage. It has been found difficult to disperse the carbon black in polyethylene in the mixer in the presence of the rubber particles. The carbon black can be predispersed in the polyethylene. Polyethylene-carbon black (PE-CB) dispersions in pellet form containing 30–50% by weight of carbon black are commercially available. These PE-CB pellets are found to readily disperse the carbon black in the larger amount of binder resin. The PE-CB pellets can be added at the mixing stage or all ingredients can be separately fed to the hopper to the extruder. Since the binder is thermoplastic it is also possible to regrind off-spec product and recycle it to the extruder. The regrind is generally ground to 30 mesh rubber particles. Since the proportions in the recycle product are the same as the composition being extruded, the ratio of feed of the fresh ingredients need not be adjusted. Generally, the recycle product is limited to no more than 5% by weight of the batch, generally about 2% by weight.

EXAMPLE 1

Porous pipe having an O.D. of 0.825 inches and a wall thickness of 0.001 inch was extruded in an unvented pipe extruder having a barrel heated to a temperature of 350° F. and a die heated to a temperature of 350° F. The water in the chiller bath was at 60° F. The extrusion rate was 150 ft/min. The composition of the mixture was 35% of linear low density polyethylene and 65% of 30 mesh reclaimed rubber have a moisture content below 0.5% by weight.

EXAMPLE 2

Example 1 was repeated utilizing a feed composition the same as Example 1 to which was added 7 additional parts per hundred parts of pellets comprised of 60/40 LLD polyethylene/carbon black. The polyethylene in the pellet need not be linear low density polyethylene but can by any resin that is freely mixable and blendable with LLD-PE. This added 2.8 parts of carbon black to 107 parts of the mixture (about 2.6% of the mixture) or 2.8 parts of carbon black to 39.2 parts of polyethylene (about 7.1% based on polyethylene).

EXAMPLE 3

A mixture of 65 parts by weight of 30 mesh rubber reclaim, 35 parts by weight of LLD-PE and 3 parts of carbon black powder were premixed in a mixer until blended. The mixture was extruded to form porous pipe in which the binder phase contains a uniform dispersion of carbon black.

Straight and bent samples of porous pipe produced in accordance with Examples 1 and 2 were placed on the roof of a facility in the Phoenix, Ariz. area for six months. The straight and bent samples of Example 1 pipe both showed degradation with the bent sample showing excessive cracking along the inner and outer walls of the bend. The straight and bent samples of Example 2 pipe did not exhibit degradation due to ambient exposure to sunlight.

Bent samples of porous pipe produced according to the procedures of Example 1 and 2 were subjected to accelerated ageing by alternatively immersing the samples in 10% Igepal solution at 160° F. according to the Environmental Stress Crack Resistance Weatherometer Test (ASTM 2239-81) and then exposing the samples to a bank of hot lights.

The unstabilized sample of Example 1 showed severe stress-crack failure while the stabilized sample of Example 2 did not exhibit stress-crack failure.

It is to be realized that only preferred embodiments of the invention have been described and that numerous substitutions, modifications and alterations are permissible without departing from the spirit and scope of the invention as defined in the following claims.

We claim:

1. A method of forming porous pipe comprising the steps of:
    forming a mixture of a thermoplastic binder resin selected from a polyolefin resin or a vinyl resin containing a dispersion of 60% to 80% by weight of vulcanized elastomer particles and said binder resin containing 0.1 to 10% by weight of an ultraviolet stabilizer based on the weight of the pipe in an amount effective to substantially reduce degradation of the binder resin due to ultraviolet radiation;
    extruding the mixture through a heated pipe die; and
    cooling the extruded pipe in a cooling trough.

2. A method according to claim 1, in which the ultraviolet stabilizer is carbon black and the carbon black is predispersed in a carrier resin miscible with the binder resin.

3. A method according to claim 2 in which the binder resin and carrier resin are polyethylene.

4. A method according to claim 1 in which the elastomer particles are present in an amount from 60% to 70% by weight.

5. A method according to claim 4 in which the elastomer particles are present in an amount from 63% to 67% by weight.

6. A method according to claim 5 in which the elastomer particles are uniformly sized.

7. A method according to claim 6 in which the particles pass a 30 mesh screen.

8. A method according to claim 1 in which the polyolefin is a polyethylene.

9. A method according to claim 8 in which the polyethylene is a low density polyethylene.

10. A method according to claim 9 in which the polyethylene is a linear low density polyethylene.

11. A method according to claim 1 in which the ultraviolet stabilizer is selected from carbon black, phenols or amines or mixtures thereof.

12. A method according to claim 11 in which the stabilizer is carbon black.

13. A method according to claim 1 in which the moisture content of the mixture before extrusion is below 0.5 percent by weight.

* * * * *